H. L. VAN VALKENBURG.
SYSTEM OF ELECTRICAL DISTRIBUTION.
APPLICATION FILED FEB. 19, 1906.

1,005,904.

Patented Oct. 17, 1911.

2 SHEETS—SHEET 1.

WITNESSES:
George J. Schwartz
Fred J. Kinsey

INVENTOR:
Hermon L. Van Valkenburg.
BY
Chas. E. Lord
ATTORNEY.

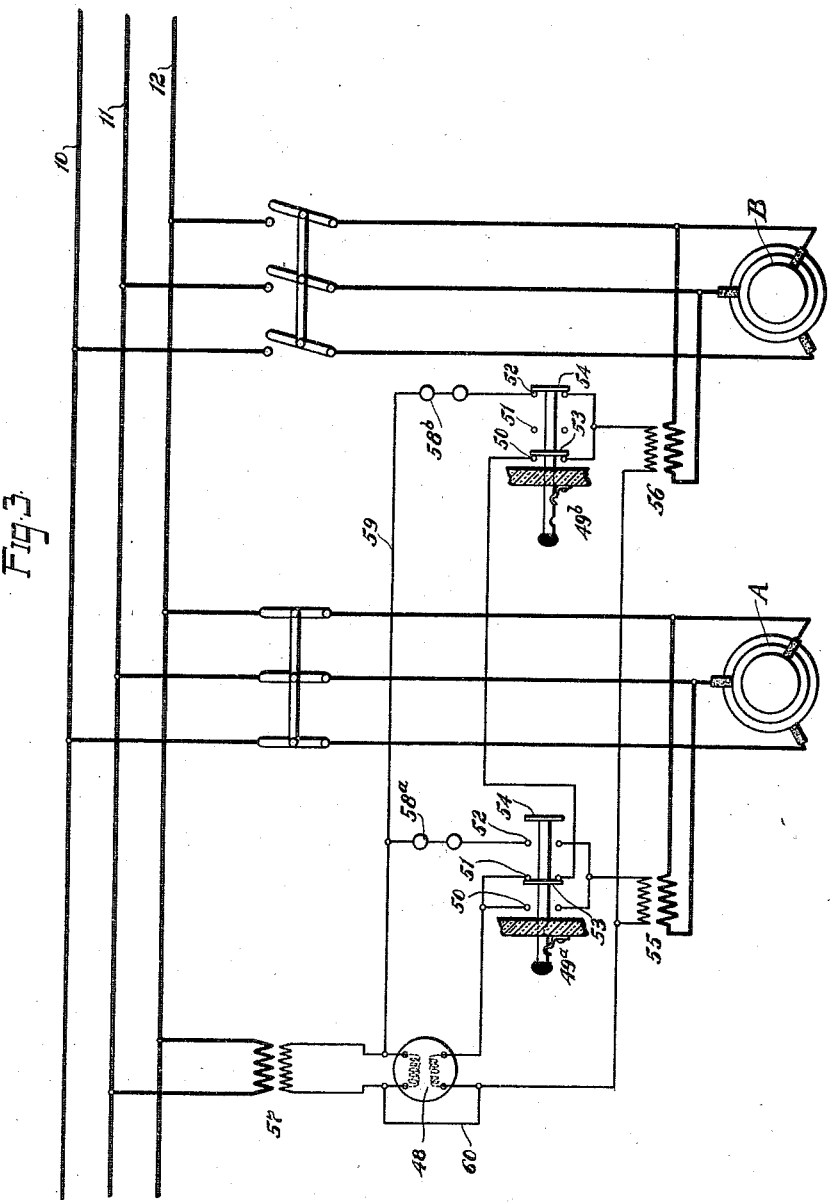

UNITED STATES PATENT OFFICE.

HERMON L. VAN VALKENBURG, OF NORWOOD, OHIO, ASSIGNOR TO THE BULLOCK ELECTRIC MANUFACTURING COMPANY, A CORPORATION OF OHIO.

SYSTEM OF ELECTRICAL DISTRIBUTION.

1,005,904.	Specification of Letters Patent.	Patented Oct. 17, 1911.

Application filed February 19, 1906. Serial No. 301,818.

*To all whom it may concern:*

Be it known that I, HERMON L. VAN VALKENBURG, citizen of the United States, residing at Norwood, in the county of Hamilton and State of Ohio, have invented certain new and useful Improvements in Systems of Electrical Distribution, of which the following is a full, clear, and exact specification.

My invention relates to systems of electrical distribution, and particularly to those in which two or more generators are operated in parallel.

As is well known, in operating generators in parallel, it is necessary, before any one generator can be connected to the bus-bars, that the voltage of that generator be made equal to the voltage of the bus-bars, and in alternating current distributing systems it is necessary that the electromotive force in the generator about to be connected to the bus-bars be brought into synchronism with the electromotive force in the bus-bars. It is customary to connect measuring instruments such as a volt-meter or a synchronizer to the generators by means of a removable plug adapted to fit into a suitable plug receptacle on each switch board panel. With this method two volt-meters are usually employed, one connected permanently to the bus-bars, and the other so connected to the several plug receptacles that it may be connected to each generator by inserting the plug in the proper receptacle. This method while satisfactory in some respects possesses several disadvantages. It is difficult to change the plug quickly from one panel to the other, and if more than one plug is employed there is a possibility that both plugs may be used at the same time in which case a short-circuit would result. Furthermore there is always danger of the plug being broken or lost.

The object of my invention is to provide convenient and reliable means for transferring measuring instruments such as a volt-meter or a synchronizer from one generator to another, or to the bus-bars.

My invention consists in the combinations and arrangements of parts described in the specification and set forth in the appended claims.

Reference is had to the accompanying drawings, in which—

Figure 1:
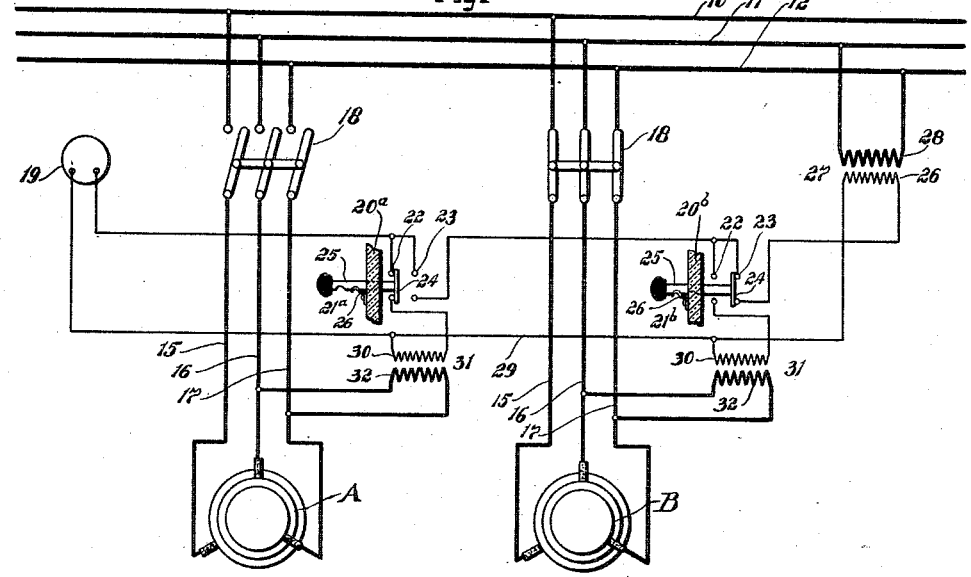
Figure 2:
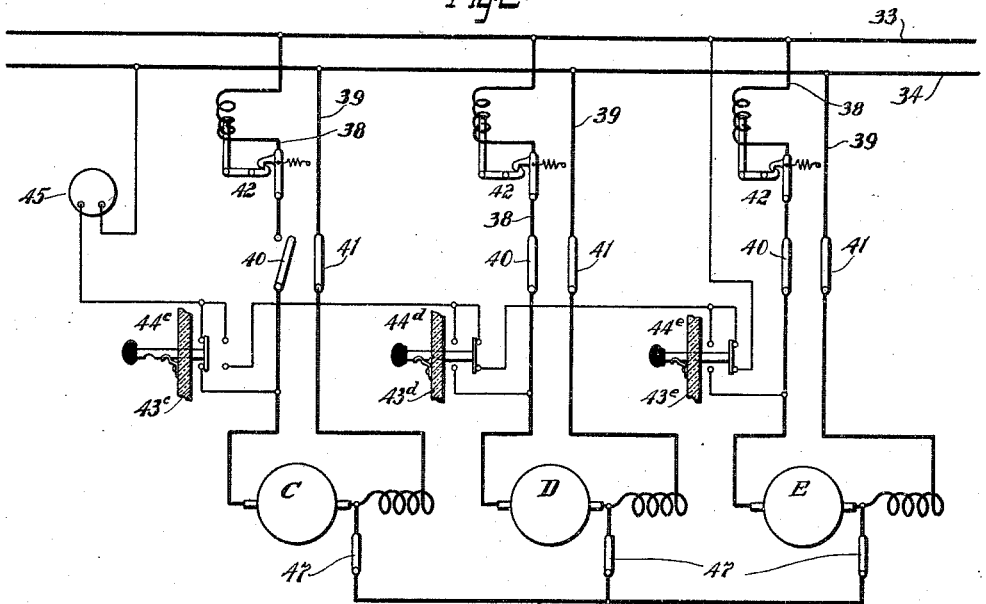

Figure 1 is a diagram of a three-phase system connected in accordance with my invention; Fig. 2 is a diagram of a direct current system equipped with my invention; and Fig. 3 is a diagram of a three-phase circuit, showing the application of my invention to a synchronizer.

Referring now to Fig. 1, the bus-bars of a three-phase system are shown at 10, 11 and 12 respectively. A plurality of generators A and B, two only being shown in this case, are adapted to be connected in parallel to the bus-bars by leads 15, 16 and 17 and switches 18, which are preferably high potential oil switches. At 19 is shown a measuring instrument, in this case a volt-meter, which may be conveniently and quickly connected to any generator or to the bus-bars as will now be described. On the switch-board panels 20$^a$ and 20$^b$ are double throw, "pull and push" switches 21$^a$ and 21$^b$. The contacts of each switch are arranged at the rear of the switch-board and the handle is arranged for operation at the front. The form of the particular switch employed is made the subject matter of my copending application No. 266,521 filed June 22, 1905. Each switch has two sets of contacts 22 and 23, the first set being adapted to be bridged by the movable contact 24 when the handle 25 is pulled outward, and the second set 23 being adapted to be bridged by the movable contact when the handle is pushed inward. In this case a spring 26, which engages notches in the handle, holds the switch in its inner or outer positions. The spring is not essential however, as the handle could be held in its inner and outer positions by friction. As is shown, one terminal of the instrument 19 is connected to the upper contacts of switch 21$^a$, the lower rear contact of the switch being connected to the upper contacts of switch 21$^b$. It will be understood that any number of generators may be connected to the bus-bars and any number of switches may be connected together in the manner described. The lower rear contact of switch 21$^b$ is connected to one terminal of the secondary 27 of a step down potential transformer, the primary 28 of which is connected across two of the bus-bars 11 and 12. The other terminal of the instrument 19 is connected by a conductor 29 to the other terminal of the secondary 27 of the transformer. Connected between the lower front terminal of each switch and the conductor 29 is the secondary 30 of a step-down potential transformer 31, the primary 32 of each one of which is connected to two conductors 16 and 17 of one of the generators.

The function of the particular type of instrument switch and connections will now be explained. When the handles 25 of all the switches are in the "in" position, it will be seen that the instrument is connected through the step-down transformer to the bus-bars, and if the instrument is a voltmeter as in the present case it would measure the voltage of one of the phases of the bus-bars. Now suppose it is desired to connect a generator to the bus-bars in parallel to one or more other generators. Before the generator can be connected to the bus-bars by closing the three pole switch 18, the voltage of the generator must be brought to the voltage of the bus-bars. By simply pulling to its outer position the handle 25 of the proper "pull and push" switch $21^a$ or $21^b$, leaving the other switch or switches in their "in" positions, the instrument is transferred from the bus-bars to the generator. In Fig. 1, the switch $21^a$ is in position to measure the voltage of one phase of generator A. To connect the instrument again to the bus-bars, all that is necessary is to push the handle 25 to its "in" position.

It will be seen that only a single voltmeter is necessary, whereas formerly at least two volt-meters were usually employed. It will also be seen that the instrument can be quickly transformed from generator to generator, or from the generator to the bus-bars. The operator can by simply pulling the switch in and out a number of times, accurately and quickly compare, on a single instrument, the voltage of generator A and that of the bus-bars. If it is desired to connect generator B to the bus-bars, in parallel with generator A, the switch $21^b$ will be operated in a similar manner, the switch $21^a$ being left in the "in" position. With the arrangement just described it will be impossible to obtain a short-circuit, no matter in what positions the switches are placed.

In Fig. 2, switches and connections are shown whereby a volt-meter may be connected directly to direct current bus-bars, or to any one of a plurality of direct current generators, in a manner similar to that described above. The bus-bars are shown at 33 and 34 respectively. The generators C, D and E are adapted to be connected in parallel to the bus-bars by leads 38 and 39 and single pole switches 40 and 41 located in the leads. A circuit-breaker 42 is preferably inserted in one of the leads of each generator. Mounted on the generator panels $43^c$, $43^d$ and $43^e$ are double-throw "pull and push" switches $44^c$, $44^d$ and $44^e$ similar in all respects to those previously described. One terminal of the volt-meter 45 is connected to bus 34 and the other terminal is connected to the upper contacts of switch $44^c$. The lower rear contact of this switch is connected to the upper contacts of the second switch $44^d$, the lower rear contact of switch $44^d$ is connected to the upper contacts of switch $44^e$, and the lower rear contact of the last switch $44^e$ is connected to the second bus 33. The lower front contact of each switch is connected to the lead 38 of its corresponding generator. An equalizer 46 is connected to the generators by equalizer switches 47. Now if it is desired to measure the voltage of the bus-bars, all the handles of the switches $44^c$, $44^d$ and $44^e$ must be in the "in" position. The volt-meter circuit will then be completed from one bus-bar through the rear contacts and bridging contacts of all the switches $44^c$, $44^d$ and $44^e$, to the opposite bus-bar. In case it is desired to connect generator C to the bus-bars, the other generators being idle, switch 41 will be closed, while switch 40, and also if desired the equalizer switches, remain open. By pulling out the handle of switch $44^c$ the voltage of generator C is indicated on the voltmeter. The voltmeter circuit is from bus 34, through the front contacts of switch $44^c$, through armature of generator C, series field, and conductor 39 to bus 34. When the voltage of the generator reaches the proper amount the generator can be connected to the bus-bars by closing the switch 40. In Fig. 2, switches $44^c$ and 40 are in position for measuring the voltage of generator C before it is connected to the bus-bars.

If it is desired to connect generator C to the bus-bars while either or both of the generators D and E are in operation, the equalizer switches of the operating generator and of the generator C should all be closed, and switch 41 may be open or closed as desired. Switch 40 is left open. If the "pull and push" switch $44^c$ is pulled "out," the voltmeter indicates the voltage of generator C. The voltmeter circuit is now as follows: bus 34, voltmeter, front contacts and bridging contact of switch $44^c$, armature of generator C, through several paths to bus 34, the paths including lead 39 of generator C if switch 41 is closed, and the equalizer and the corresponding leads 39 of the other generators. By simply pushing in the "pull and push" switch $44^c$, the voltmeter can be quickly transferred from generator C to bus-bars, provided the switches $44^d$ and $44^e$ are both "in," and when the voltage of the generator is the same as that of the bus-bars the switch 40 can be closed.

If it is desired to start and connect generator D to bus-bars, assuming that the other generators are already connected thereto, switch 40 in lead 38 of generator D will be left open, as may also switch 41 in lead 39, switch $44^c$ will be "in" and switch $44^d$ will be pulled out. The voltage of generator D can then be read on the voltmeter. If switch 44ᵉ is also in the "in" position, the voltmeter can be transferred from generator D to bus-bars. When the voltmeter is connected to generator D, the voltmeter circuit is as follows: bus 34, voltmeter, rear contacts of switch 44ᶜ, front contacts of switch 44ᵈ, armature of generator D, and lead 39 of generator D and equalizers and leads 39 of generators C and E to bus 34. In a similar manner by placing switches 44ᶜ and 44ᵈ in their "in" positions and switch 44ᵉ in its "out" position, the voltmeter can be transferred to generator E and its voltage can be determined.

In Fig. 1 are illustrated only the voltmeter connections for the three-phase circuit, but it is evident that the same type of switches and connections can be used for the synchronizer as well.

In Fig. 3 I have illustrated a three-phase system and the proper "pull and push" switches and connections whereby either generator can be easily and quickly connected to the synchronizer. It is to be understood that the voltmeter, transformers, switches and connections, and the synchronizer, transformers, switches and connections will be used on the same system, being shown in different figures merely to avoid confusion. The three-phase generators A and B are connected to the bus-bars 10, 11 and 12 as in Fig. 1. At 48 is shown a standard synchronizer which by means of "pull and push" switches can be connected to any of the generators in the station. Two generators only being shown, only two switches 49ᵃ and 49ᵇ are shown. These switches, in this case, are slightly different from the voltmeter switches, having extra contacts for a purpose which will appear. Each switch has three pairs of contacts 50, 51 and 52, the first and second pairs being adapted to be bridged by a movable contact 53, and the last pair by a movable contact 54. Contacts 50 and 51 of each switch are connected to each other (except in the case of the switch farthest to the right, which need not be so connected), to step-down transformers 55 and 56, and to the synchronizer in precisely the same manner as the contacts of the voltmeter switches are connected to each other, to the step-down transformers 31, and to the voltmeter. The synchronizer 48 is connected to bus-bars 11 and 12 by the step-down transformer 57.

The operation and function of the switches as so far described are the same as the operation and function of the voltmeter switches. If handle of switch 49ᵃ is pulled out, generator A is connected to the synchronizer. If handle of switch 49ᵃ is "in" and handle of switch 49ᵇ is "out," generator B is connected to the synchronizer.

As a check upon the synchronizer 48, I may provide synchronizing lamps 58ᵃ and 58ᵇ, one set being provided for each generator. In order that the lamps of the generator, the phase of the current of which is to be determined relative to the phase of the current in the bus-bars, will be properly connected into circuit, I provide on each synchronizing switch the additional pair of contacts 52 previously referred to. Each pair of synchronizing lamps is connected to the upper contact of one of the pairs of contacts 52 and all the lamps are connected to one side of the standard synchronizer 48 by lead 59. The lower contact of each pair of contacts 52 of each switch is connected to the lower contact of the pair 50 of that switch. The two synchronizer circuits are also provided with the common connection 60. It is seen that when the handle of switch 49ᵃ is pulled out, so as to connect generator A to the synchronizer 48, the circuit through the synchronizing lamps 58ᵃ is completed, and the lamps will indicate when the currents in the generator and bus-bars are in phase in the ordinary manner, as a check upon the indication of the synchronizer 48. Likewise when generator B is connected to the synchronizer 48, lamps 58ᵇ indicate the phase of the current of generator B, relative to the phase of the current in the bus-bars. The middle contacts 51 of switch 49ᵇ as shown have no electrical connections, it being understood that these contacts are to be connected to the switch of a third generator should it be employed in the station.

In Figs. 1 and 2, the voltmeter switches, and in Fig. 3 the synchronizing switches, so far as they relate to the synchronizer instrument are single pole switches. This type of switch is employed for the reason that in each case it is only necessary to connect one side of the instrument to the different generator circuits, the other side of the instrument being connected to a point common to all the circuits. In some cases it may be necessary to connect both sides of the instrument to the corresponding sides of the different circuits, and in other cases it may be necessary to connect more than two points of the instrument to the circuits. In the latter cases, it will be necessary to employ multi-pole switches, two-pole switches being necessary to connect two points of the instrument to any one of the different circuits, and three-pole switches to connect three points to any one of the different circuits.

I have explained above how an instrument can be quickly transferred from a generator to the bus-bars or from the bus-bars to a generator by manipulating a single switch. The instrument can, in somewhat similar manner, be connected to either one of any two circuits. For example, in Fig. 2 suppose switches 44ᶜ and 44ᵈ are in their "in" positions and switch 44ᵉ is out, the instrument 45 is then connected to a generator E. Now suppose that one of the other switches, for example 44ᶜ, is pulled out while switch 44ᵉ is in its "out," position. It is seen that the instrument is transferred to generator C. Now in case it is desired to retransfer the instrument to generator E, all that is necessary is to push the handle of switch 44ᶜ to its "in" position. Thus, by simply manipulating switch 44ᶜ the instrument can be transferred to either one of the two circuits, namely to generator circuit C and generator circuit E. In a similar manner if switch 44ᶜ is in its "in" position, and switch 44ᵉ is in its "out" position by manipulating switch 44ᵈ the instrument can be quickly transferred to the circuit of generator D or to the circuit of generator E. The instrument can, therefore, be connected to either one of any two circuits by simply manipulating one switch providing the other instrument switches have been previously placed in their proper positions.

I have explained my invention in connection with a distributing system consisting of a plurality of generators adapted to be connected in parallel to the bus-bars. It is evident however, that my invention is not limited to this use alone, but may be employed for connecting an instrument to one of several circuits of any character.

In Figs. 1 and 2 I have shown the voltmeter adapted to be connected to a plurality of circuits by switches, the number of which is one less than the number of circuits. For example, in Fig. 2, three switches are employed for connecting the instrument to either one of the three generator circuits or to the bus-bars. If desired, however, the number of switches could be the same as the number of circuits, the connections then being substantially similar to the changeable connections of the synchronizer of Fig. 3.

I aim in my claims to cover all modifications which do not involve a departure from the spirit and scope of my invention.

What I claim as new and desire to secure by Letters Patent is:—

1. In a system of distribution, the combination of bus-bars, a plurality of generators adapted to be connected thereto in parallel, an indicating instrument, a double-throw switch for each generator, the switches being arranged in order, and connections from each switch to its associated generator, from each switch to each adjacent switch, and from the end switches to the instrument and to the bus-bars respectively, so that the instrument can be connected to the bus-bars and to each one of said generators separately.

2. In a system of distribution, the combination of bus bars, a plurality of generators adapted to be connected thereto in parallel, a measuring instrument, a double-throw switch for each generator, said switches being arranged in order, and connections between each switch and its neighbor or neighbors, from each switch to its associated generator, and from certain of the switches to the instrument and to the bus-bars, so that said instrument may be connected to the bus-bars or to any one of said generators, whereby an electrical condition of each generator may be determined relatively to that of the bus-bars.

3. In a system of distribution, the combination of bus-bars, a plurality of generators, means for connecting said generators in parallel to said bus-bars, a measuring instrument, and a double-throw switch for each of said generators, said switches having contacts which when all of the switches are in one position are all in series to connect the instrument to the bus-bars, and each switch having another contact which when said switch is thrown to the opposite position makes the connection to connect the instrument to the generator corresponding to that switch.

4. In a system of distribution, the combination of a plurality of circuits, a measuring instrument, a plurality of double-throw switches, and connections from each switch to one of the circuits, from each switch to one or more others of the switches, and from one of the switches to the instrument, so that by manipulating said switches the instrument can be connected to any one of the circuits separately only.

5. In a system of distribution, the combination of a plurality of generators, bus-bars to which said generators are adapted to be connected, a measuring instrument, and a double-throw switch for each generator, the switches when all in one position being connected in series and connecting the instrument to the bus-bars, and each switch when in the other position either connecting its associated generator to the instrument directly or else so connecting it through one or more of the other switches provided the latter are in the first-named position.

6. In a system of distribution, the combination of a plurality of generators, bus-bars to which said generators are adapted to be connected, an indicating instrument and a double-throw switch for each generator, certain contacts of one switch being connected to the indicating instrument and to one generator, and the contacts of a second switch being connected to a contact of the first switch and to the second generator, whereby the generators may be connected to the indicating instrument separately but are prevented from being so connected simultaneously.

7. In a system of distribution, the combination of bus-bars, a plurality of generators adapted to be connected thereto in parallel, an indicating instrument, a double-throw switch for each generator, and connections from each switch to its associated generator, from one of the switches to the instrument, from one of the switches to the bus-bars, and from each switch to one or two others of the switches, so that said instrument can be connected to the bus-bars and to each one of said generators separately only.

8. In a system of distribution, the combination of a plurality of generators, bus-bars to which said generators are adapted to be connected in parallel, an indicating instrument, and an instrument switch for each generator, one of said switches having contacts connected to the instrument and to a generator whereby that generator may be connected to the instrument, a second switch having contacts connected to the first switch and to a second generator whereby the second generator may be connected to the instrument through the first switch provided said first switch is in proper position and then only.

9. In a system of distribution, the combination of a plurality of generators, bus-bars to which said generators are adapted to be connected in parallel, a measuring instrument, a double-throw instrument switch for each generator, each switch having contacts to connect the corresponding generator to the instrument when the switch handle is in one position, and other contacts to connect the instrument to another circuit only when the said handle is in its opposite position, and interconnections between the instrument switches to prevent the instrument from being connected to more than one circuit at a time.

10. In a system of distribution, the combination of a plurality of generators, bus-bars to which said generators are adapted to be connected, an indicating instrument, and a double-throw instrument switch for each generator, the first switch having contacts to be bridged when the handle is in one position to connect the first generator to the instrument, and other contacts to be bridged when the handle is in its opposite position to complete the otherwise open instrument circuit for another generator when the handle of the switch of that generator is in its proper position.

11. In a system of distribution, the combination of a plurality of generators, bus-bars to which the generators are to be connected in parallel, an indicating instrument, a "pull and push" instrument switch for connecting each generator to the instrument, each of said switches having a plurality of pairs of contacts adapted to be bridged when the switch handles are in their "in" and "out" positions, each switch having a contact connected to its corresponding generator whereby each generator can be connected to the instrument when the switch handles are in their proper positions, and interconnections between the switches for preventing the instrument from being connected to more than one generator at a time.

12. In a system of distribution, the combination of a plurality of generators, bus-bars to which the generators are adapted to be connected in parallel, an indicating instrument, a double-throw instrument switch for each generator, the switches being arranged in order, and connections for the switches so that the first switch in its two positions connects the instrument to the corresponding generator and to the succeeding switch respectively, and each other switch in its two positions respectively connects its associated generator and the succeeding switch, if any, to the preceding switch.

13. In a system of distribution, the combination of a plurality of circuits, an indicating instrument, and a double-throw instrument switch for at least each circuit save one, said switches being arranged in order, the first having connections so that in its two positions it connects said instrument to one of said circuits and to the next switch respectively, and each succeeding switch having connections so that when in one position it connects the preceding switch to one of the other circuits, and each of said succeeding switches except the last also having connections so that when it is in the other position it connects the next preceding switch to the next succeeding switch, so that by manipulating a single switch, the other switches being in proper positions, the connection of the measuring instrument can be changed between any two of said circuits.

14. In a system of distribution, the combination of a plurality of circuits, an indicating instrument, double-throw instrument switches corresponding to various ones of said circuits, and connections from each switch to one of the circuits, from each switch except the first to the next preceding switch, and from the first switch to the instrument, so that by manipulating a single switch the measuring instrument can be connected either to the circuit corresponding to that switch or to another circuit.

15. In a system of distribution, the combination of a plurality of circuits, an indicating instrument, a plurality of double-throw instrument switches not greater than the number of circuits, the switches being arranged in order, and connections from each switch to one or more of the other switches, from each switch to one or more of the circuits, and from the first switch to the instrument, so that when one switch is in one position and the preceding switches are all in the other position the instrument is connected to a circuit connected to said switch, when a preceding switch is manipulated the instrument is transferred to a circuit connected to that switch, and when the latter switch is restored to its original position the instrument is re-transferred to the circuit to which it was originally connected.

16. In a system of distribution, the combination of a plurality of circuits, a measuring instrument, and a plurality of double-throw instrument switches, the number of which is one less than the number of circuits, the switches being arranged in order and when in one position being all connected in series and connecting the instrument to one of the circuits, and each switch when moved to the other position disconnecting all succeeding switches, if any, and connecting another circuit to the preceding switch or switches and through it or them, if in proper position, to the instrument.

17. In a system of distribution, the combination of a plurality of circuits, a measuring instrument, a plurality of double-throw instrument switches, the number of which is one less than the number of circuits, the switches being arranged in order, and when in one position being all connected in series and connecting one of the circuits to the instrument, and each switch when moved to the other position disconnecting all succeeding switches from the instrument and connecting one of the circuits to the preceding switch, so that by manipulating a single switch, the other switches being in proper positions, the connections of the measuring instrument can be changed between any two of said circuits.

18. In a system of distribution, the combination of a plurality of circuits, an indicating instrument, a plurality of instrument switches, the switches being arranged in order with each switch controlling the connections of the instrument to one of the circuits and to the next succeeding switch, if any, so that the instrument can be connected to only one circuit at one time.

19. In a system of distribution, the combination of a plurality of circuits, an indicating instrument, and a plurality of double-throw switches for connecting said instrument to the circuits, said switches being arranged in order, the first switch when in its two positions connecting said instrument to one of the circuits and to the following switch respectively, and the other switches when in one position each connecting the preceding switch to the succeeding switch, if any, and when in the other position connecting the preceding switch to one of the other circuits, so that it will be impossible to connect the instrument to more than one circuit at one time.

20. In a system of distribution, the combination of a plurality of circuits, an indicating instrument, a plurality of double-throw switches arranged in order, and connections from the first switch to the instrument, from each of the other switches to the next preceding switch, and from each switch to one of the circuits, such that when any switch is in one position and all preceding switches, if any, are in the other position, the circuit corresponding to that switch is connected to the instrument through that switch and all preceding switches in series.

21. In a system of distribution, the combination of a plurality of principal circuits, an indicating instrument, a plurality of double-throw switches arranged in order, a connection from each switch to one of said principal circuits, and a set of connections whereby a potential circuit to the instrument exists from each principal circuit in series through the corresponding switch in one position and all the preceding switches in the other positions, said instrument circuit for any principal circuit being interrupted when any of said switches are not in the positions specified.

22. In a system of distribution, the combination of a plurality of circuits, an indicating instrument, a plurality of double-throw switches arranged in order and each having one of the circuits associated with it, and a series connection which extends from the instrument through said switches in order as far as they are in one position and then through the first switch which is in the other position to the circuit associated with said switch.

23. In a system of distribution, the combination of a plurality of circuits, an indicating instrument, a plurality of double-throw switches arranged in order and each having one of the circuits associated with it, the last switch in order also having an additional circuit associated with it, and a series connection which extends from the instrument through said switches in order so far as they are in one position and then through the first switch which is in the other position to the circuit associated with said switch, or if they are all in one position through all of said switches in order to the additional circuit associated with the last switch in order.

In testimony whereof I affix my signature, in the presence of two witnesses.

HERMON L. VAN VALKENBURG.

Witnesses:
 ARTHUR F. KWIS,
 FRED J. KINSEY.

Copies of this patent may be obtained for five cents each, by addressing the "Commissioner of Patents, Washington, D. C."